United States Patent
Otsuka et al.

(10) Patent No.: US 7,478,497 B2
(45) Date of Patent: Jan. 20, 2009

(54) FISH HANDLING TOOL

(75) Inventors: Takashi Otsuka, 11-18. Higashiyaguchi 3-chome, Ota-ku, Tokyo (JP); Takaya Imai, Yokohama (JP); Hideto Midorikawa, Tokyo (JP)

(73) Assignee: Takashi Otsuka, Tokyo (JP)

( * ) Notice: Subject to any disclaimer, the term of this patent is extended or adjusted under 35 U.S.C. 154(b) by 100 days.

(21) Appl. No.: 11/337,468

(22) Filed: Jan. 24, 2006

(65) Prior Publication Data
US 2006/0162229 A1 Jul. 27, 2006

(30) Foreign Application Priority Data
Jan. 25, 2005 (JP) .............................. 2005-017048

(51) Int. Cl.
*A01K 97/00* (2006.01)
*B66C 1/28* (2006.01)

(52) U.S. Cl. ................... 43/4; 43/5; 177/148; 177/232; 177/245; 294/109; 294/115

(58) Field of Classification Search ................ 43/5, 43/53.5, 4, 17.2; 177/131, 148, 225, 232, 177/233, 245; 294/16, 109, 115
See application file for complete search history.

(56) References Cited

U.S. PATENT DOCUMENTS

| | | | | |
|---|---|---|---|---|
| 75,800 A | * | 3/1868 | Scholl | 294/109 |
| 101,524 A | * | 4/1870 | Scoville | 294/109 |
| 206,659 A | * | 8/1878 | Brigham | 177/148 |
| 207,204 A | * | 8/1878 | Payson | 177/131 |
| 406,546 A | * | 7/1889 | Taber | 294/19.3 |
| 452,278 A | * | 5/1891 | Mcilvaine | 43/5 |
| 592,499 A | * | 10/1897 | Stephens | 294/115 |
| 953,613 A | * | 3/1910 | Hammat | 294/109 |
| 1,453,301 A | * | 5/1923 | Winkler | 294/22 |
| 1,458,014 A | * | 6/1923 | Wailes | 177/245 |
| 1,464,232 A | * | 8/1923 | Beam | 177/131 |
| 1,568,808 A | * | 1/1926 | Davison et al. | 294/115 |
| 1,580,416 A | * | 4/1926 | Cromwell et al. | 294/115 |
| 1,665,661 A | * | 4/1928 | Glessale | 294/19.3 |
| 1,692,325 A | * | 11/1928 | Bellile et al. | 294/19.3 |
| 1,728,864 A | * | 9/1929 | Kramer | 43/53.5 |
| 1,941,064 A | * | 12/1933 | Wendt | 294/115 |
| 1,949,452 A | * | 3/1934 | Chadwick | 43/4 |
| 2,054,236 A | * | 9/1936 | Behr | 43/53.5 |
| 2,193,073 A | * | 3/1940 | Norton | 294/100 |
| 2,289,810 A | * | 7/1942 | Tallmadge | 43/53.5 |
| 2,511,142 A | * | 6/1950 | Zwoboda et al. | 294/16 |
| 2,533,230 A | * | 12/1950 | Dixon | 294/19.3 |
| 2,579,812 A | * | 12/1951 | Fisher et al. | 294/19.3 |
| 2,584,881 A | * | 2/1952 | Johnson et al. | 294/19.3 |
| 2,595,989 A | * | 5/1952 | Smeltz | 43/53.5 |
| 2,619,859 A | * | 12/1952 | Peronto | 43/53.5 |

(Continued)

FOREIGN PATENT DOCUMENTS

JP    A 2002-045098    2/2002

*Primary Examiner*—Darren W Ark
(74) *Attorney, Agent, or Firm*—Oliff & Berridge, PLC

(57) ABSTRACT

A fish handling tool which provides an easier and more stable nipping operation for holding a fish. The fish handling tool is structured that a finger hooking position of a finger hooking opening provided in an operating member crosses a center line of a rod-like grip so that the finger hooking position does not become eccentric.

13 Claims, 18 Drawing Sheets

U.S. PATENT DOCUMENTS

| | | | | |
|---|---|---|---|---|
| 2,634,158 A * | 4/1953 | Tibbs | | 294/115 |
| 2,643,151 A * | 6/1953 | Zupancic | | 43/53.5 |
| 2,654,632 A * | 10/1953 | Herbert | | 43/53.5 |
| 2,712,467 A * | 7/1955 | Rice | | 294/115 |
| 2,759,758 A * | 8/1956 | Yancey | | 43/5 |
| 2,807,495 A * | 9/1957 | Pillstrom | | 43/53.5 |
| 2,817,556 A * | 12/1957 | White | | 294/116 |
| 2,836,004 A * | 5/1958 | Stader | | 43/53.5 |
| 2,891,811 A * | 6/1959 | Strickler | | 43/4 |
| 2,894,782 A * | 7/1959 | Puckett et al. | | 294/115 |
| 2,930,648 A * | 3/1960 | Allan | | 43/5 |
| 2,947,106 A * | 8/1960 | Lewan | | 43/53.5 |
| 2,991,530 A * | 7/1961 | Johnson et al. | | 43/4 |
| 2,994,622 A * | 8/1961 | Miller | | 177/245 |
| 3,013,517 A * | 12/1961 | Isham | | 294/116 |
| 3,041,102 A * | 6/1962 | Day | | 294/19.3 |
| 3,051,521 A * | 8/1962 | Skowron | | 294/110.1 |
| 3,208,786 A * | 9/1965 | Eddleman | | 43/5 |
| 3,253,850 A * | 5/1966 | Trusty | | 294/16 |
| 3,288,513 A * | 11/1966 | Behrick | | 294/19.3 |
| 3,395,768 A * | 8/1968 | Benbow | | 177/232 |
| 3,521,396 A * | 7/1970 | Allen | | 43/53.5 |
| 3,833,252 A * | 9/1974 | Redding | | 43/5 |
| 3,848,689 A * | 11/1974 | Hilterhaus | | 177/245 |
| 3,869,822 A * | 3/1975 | Tieman | | 43/53.5 |
| 3,978,605 A * | 9/1976 | Maruniak | | 43/5 |
| 3,986,287 A * | 10/1976 | Arteaga | | 43/5 |
| 4,598,492 A * | 7/1986 | Stanfield | | 43/5 |
| 4,783,926 A * | 11/1988 | McKinney et al. | | 43/5 |
| 4,845,876 A * | 7/1989 | Dodson | | 43/5 |
| 4,934,089 A * | 6/1990 | Samar | | 43/5 |
| 4,965,954 A * | 10/1990 | Cavazos | | 43/4 |
| 4,965,958 A * | 10/1990 | Cedergreen et al. | | 294/16 |
| 5,088,223 A * | 2/1992 | Chu | | 177/245 |
| 5,119,585 A * | 6/1992 | Camp | | 43/53.5 |
| 5,832,651 A * | 11/1998 | Arntz | | 43/5 |
| 6,079,141 A * | 6/2000 | Washecka | | 43/5 |
| 6,094,996 A * | 8/2000 | Campbell et al. | | 177/245 |
| 6,256,923 B1 * | 7/2001 | Norton | | 43/4 |
| 6,339,198 B1 * | 1/2002 | Yamanouchi | | 177/245 |
| 6,389,731 B1 * | 5/2002 | Freeman | | 43/4 |
| 6,438,891 B1 * | 8/2002 | Aboczky | | 43/53.5 |
| 6,560,913 B1 * | 5/2003 | Liao | | 43/5 |
| 6,658,783 B1 * | 12/2003 | Yamanaka | | 43/4 |
| 6,696,650 B2 * | 2/2004 | Muller et al. | | 43/4 |
| 6,766,609 B1 * | 7/2004 | Aboczky | | 43/5 |
| 6,769,212 B2 * | 8/2004 | Grayson | | 43/4 |
| 6,943,304 B1 * | 9/2005 | Brady et al. | | 43/5 |
| 6,968,644 B1 * | 11/2005 | Garcia | | 43/4 |
| 6,983,559 B1 * | 1/2006 | Kraus | | 43/4 |
| 6,989,495 B2 * | 1/2006 | Yang | | 177/131 |
| 7,076,910 B1 * | 7/2006 | Xifra | | 43/5 |
| 7,216,553 B2 * | 5/2007 | Robinson | | 73/862.393 |
| 7,408,125 B2 * | 8/2008 | Lentine | | 43/4 |

\* cited by examiner

Fig. 14 (A)
Fig. 14 (B)
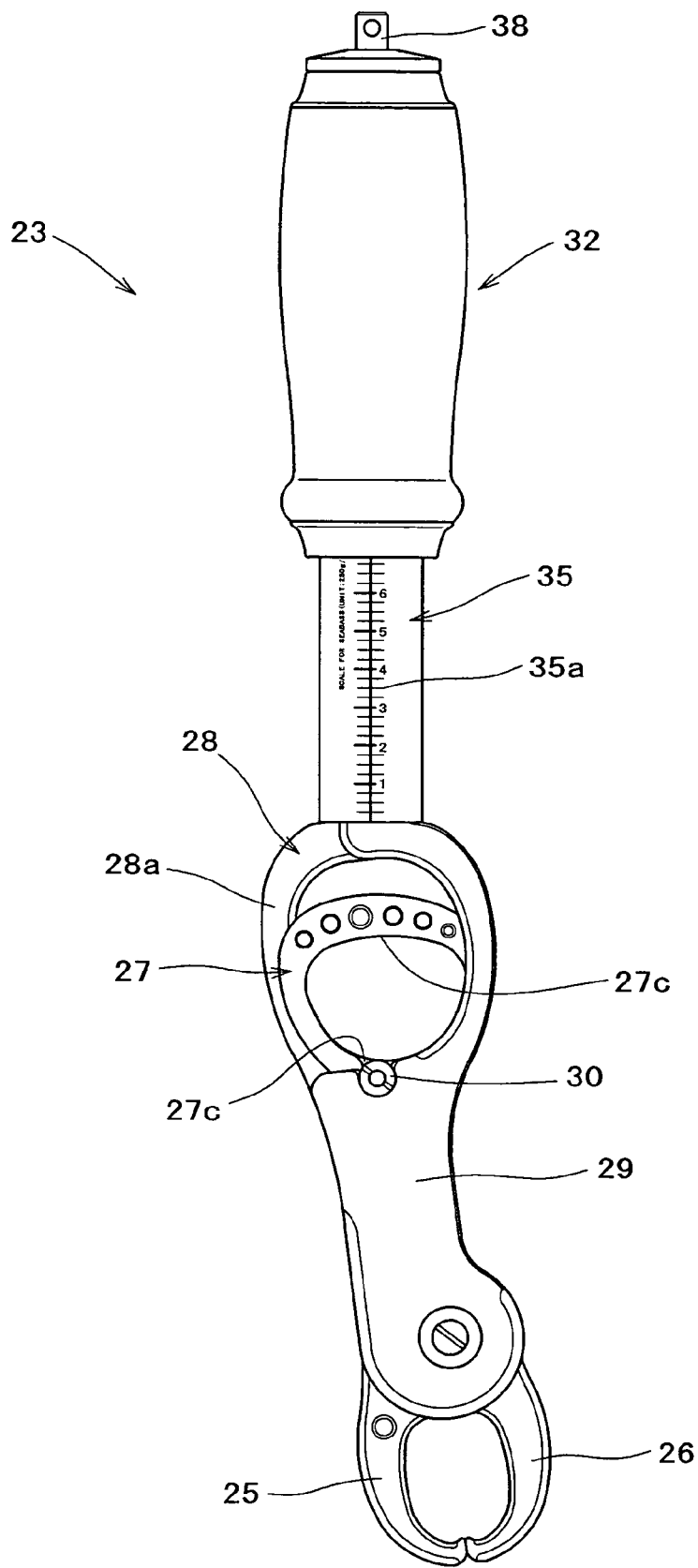
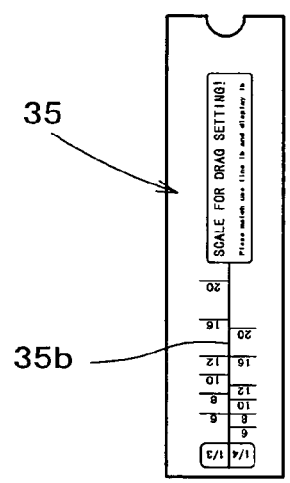

FISH HANDLING TOOL

This application claims priority from JP 2005-017048, filed Jan. 25, 2005, the entire disclosure of which is incorporated herein by reference thereto.

BACKGROUND

The disclosure pertains to a fish handling tool provided with a nipping part to nip a fish caught from the sea or a river and a balance part with which the fish is weighed.

Recently, sports fishing, in which a caught fish is released, has become popular. In this case, when a caught fish is seized by hand and a hook is removed, this not only makes slime on the surface of the fish body adhere to the hand but also injures and debilitates the fish. Thus, it becomes difficult for the fish to survive in extreme environments although the fish is released. Therefore, a fish handling tool that nips the mouth of a fish to handle the fish has been proposed (for example, refer to Japanese Published Unexamined Patent Application No. 2002-45098).

However, this fish handling tool is structured so that a movable tooth takes the opening posture in the natural state where an operating member is urged by a spring and that by operating the operating member against the spring the movable tooth is closed to nip a fish. In order to keep the nipping state, a locking means is required so as to lock in the state where the operating member has moved against the spring. Therefore this fish handling tool has a problem because a fish will be dropped off if the locking means is suddenly released by some impacts.

Then, a structure is proposed that a fish handling tool has a nipping posture, where a fish is nipped by movable teeth in natural state, and an opening state, where both tip ends of the movable teeth open from the nipping state by moving the operating member against a spring. Then, by releasing the operating member, the nipping state is returned and locked while enabling a fish to be weighed (for example, refer to U.S. Pat. No. 5,119,585).

SUMMARY

In case of the device mentioned above where the teeth are movable and the nipping posture is returned and locked by releasing the operating member when trying to nip the mouth of a fish, that is, by applying a tip end of one movable tooth to a jaw of the fish, it is difficult to nip it because nipping is done in unstable conditions due to the movement of the applied movable tooth, which is a problem to be solved. In this device, the operating member is provided with a finger hook whose finger hooking position is disposed sideways displacing from the center line of the grip. Therefore there is a further problem that the operation is difficult because the finger hooking position is offcentered when trying to hook fingers and to pull the finger hook.

Furthermore, a weighing gradation portion for weighing a fish protrudes from the base end of the grip when holding a handle which protrudes from the base end of the grip and has weighing gradations on the outer circumferential surface by changing hands from the grip in a state that the fish is nipped, which is cumbersome and brings not good operationality. These are the problems to be solved by the invention.

The invention was made in view of the circumstances described above to solve the problems. According to a first aspect, a fish handling tool comprises a rod-like grip; a main body supported by the grip at the base end; a fixed tooth fixed to the tip end of the main body at the base end; a movable tooth pivotally supported by the tip end of the main body at the base end and allowing the tip end to abut against the tip end of the fixed tooth; a lock means for preventing the movable tooth from moving so as to not separate the tip end of the movable tooth from the tip end of the fixed tooth; an operating member movably provided on the main body; a forced movement means provided between the operating member and the lock means and forcibly separating the tip end of the movable tooth from the tip end of the fixed tooth by releasing the rock means by forcibly moving a finger hook provided on the operating member toward the grip; and a return spring returning the forced movement means along with the lock means, the operating member and the movable tooth into the original positions by releasing the forced movement of the finger hook, wherein the finger hooking position with respect to the finger hook crosses the center line of the rod-like grip.

By arranging as described above, the fish handling tool can realize a good operationality because the position of the fingers with respect to the finger hook crosses the center line of the rod-like grip. As a result, hooking on and pulling up the finger hook are done along the center line of the rod-like grip, where the position of the fingers is never offcentered. Moreover when nipping a fish, first, a tip end of a fixed tooth is inserted into a jaw of a fish in the state of hooking fingers on a finger hook and of separating a movable tooth from a fixed tooth and then taking off fingers from the finger hook causes the movable tooth to return to the original position and to contact outside the jaw, thereby nipping the jaw of the fish. Therefore unlike the conventional tool having the structure of the tooth that abuts inside the jaw of the fish is movable, the invention can realize the stable nipping operation without failure.

In the exemplary embodiments, the fish handling tool further comprises a balance part that is internally installed in the grip and has a movable member elastically held by a spring, the main body supported by the movable member, wherein weighing graduations for indicating a weight of a fish body and drag graduations for indicating a drag force of a reel are provided on the outer circumferential surface of the movable member.

By arranging as described above, the drag adjustment can be done by using a fish handling tool.

In the exemplary embodiments, the drag graduations indicate values multiplied by a strength of a nylon string to be used by predetermined constants.

By arranging as described above, the drag adjustment can be done according to the nylon string strength.

In the exemplary embodiments, the drag graduations are indicated by values indicating the strength of a nylon string to be used.

By arranging as described above, the drag adjustment according to the nylon string strength can be done by reading a drag graduation.

In the exemplary embodiments, the drag graduations are provided in parallel to the weighing graduations.

By arranging as described above, the tool realizes immediate understanding of correspondence between the drag graduations and weighing graduations, and this is convenient.

In the exemplary embodiments, the drag graduations are provided by being pulled out of the weighing graduations.

By arranging as described above, the tool prevents the drag graduations at nylon string strengths close to each other from overlapping each other and makes it easy to view the graduations.

BRIEF DESCRIPTION OF THE DRAWINGS

The description of the exemplary embodiments will be made with reference to the drawings, in which:

FIG. 14 (A) is a front view of a fish handling tool in a second exemplary embodiment showing weighing graduations and FIG. 14 (B) is a rear view of a graduation tube indicating drag graduations;

DETAILED DESCRIPTION OF EMBODIMENTS

Figure 5:
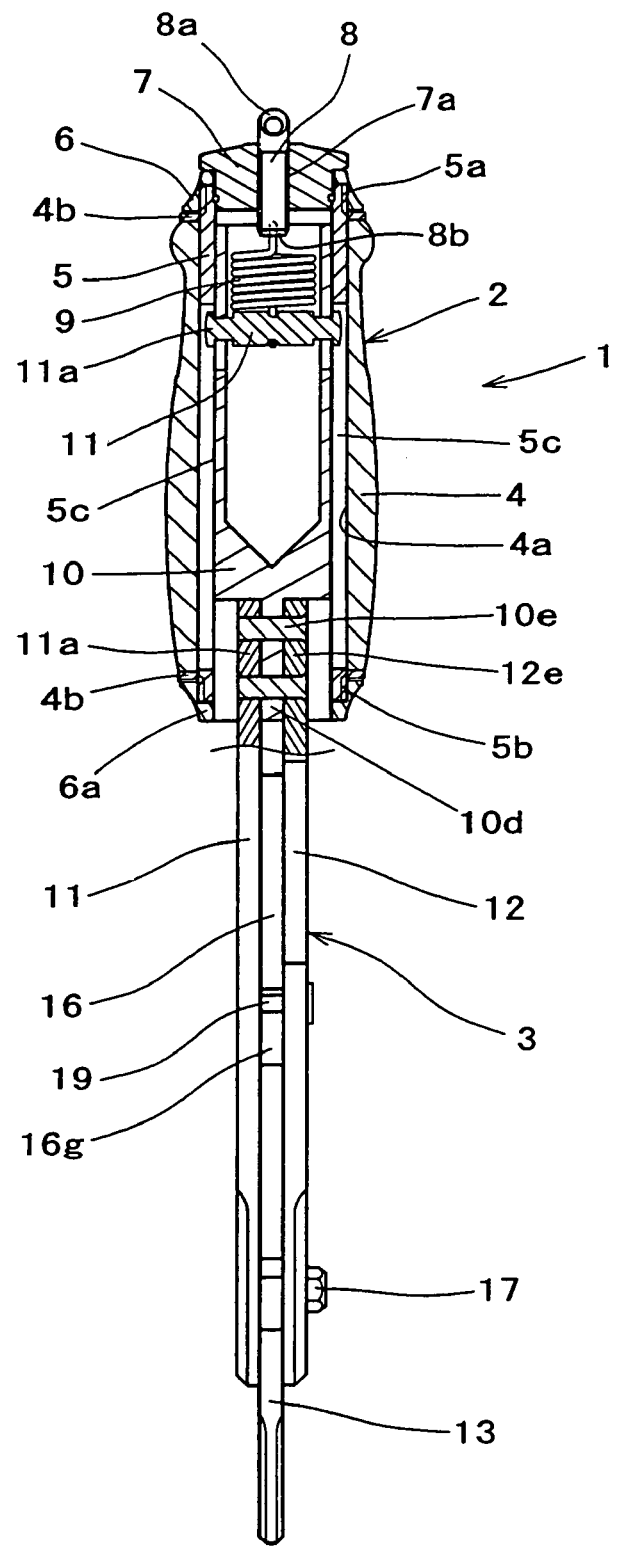
FIG. 5 is a side view including a longitudinal section of the balance part of the fish handling tool.
Figure 6:
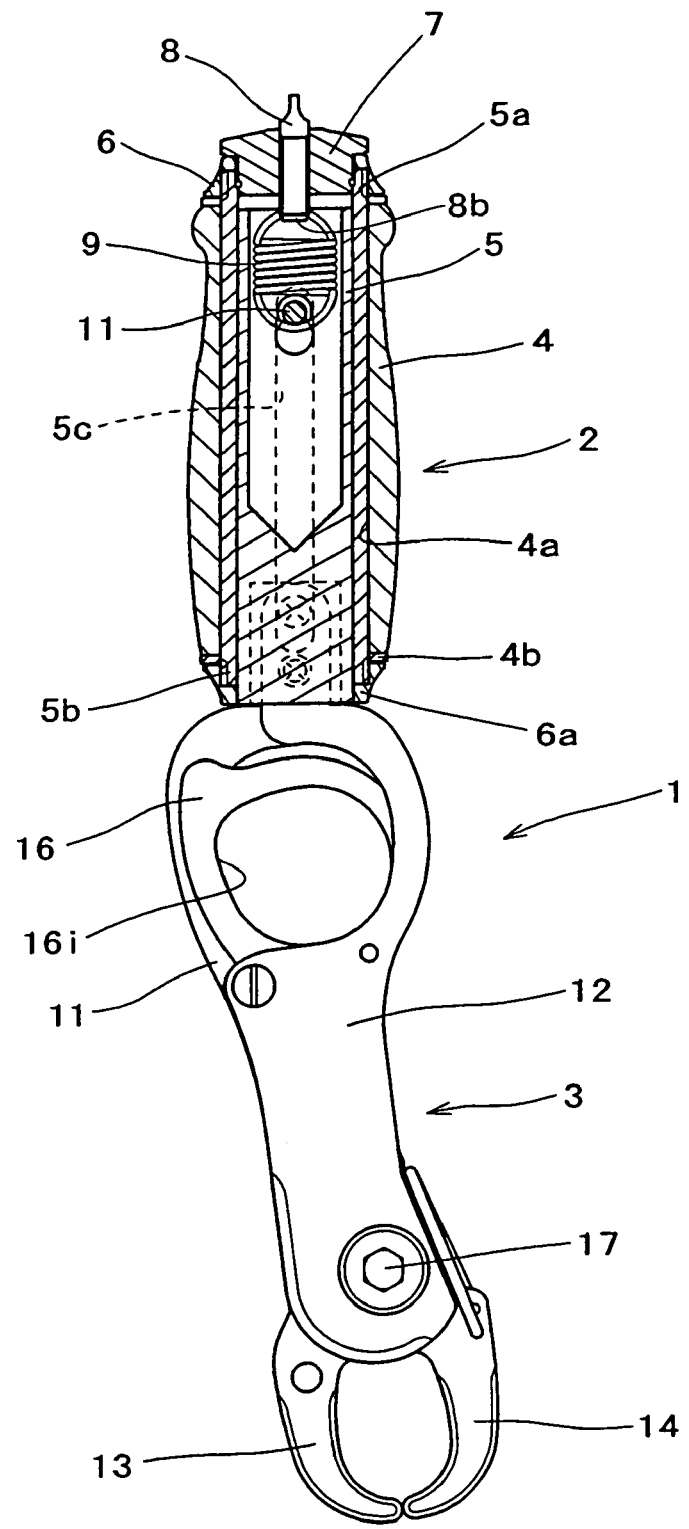
FIG. 6 is a front view including a longitudinal section of the balance part of the fish handling tool.
Figure 7:
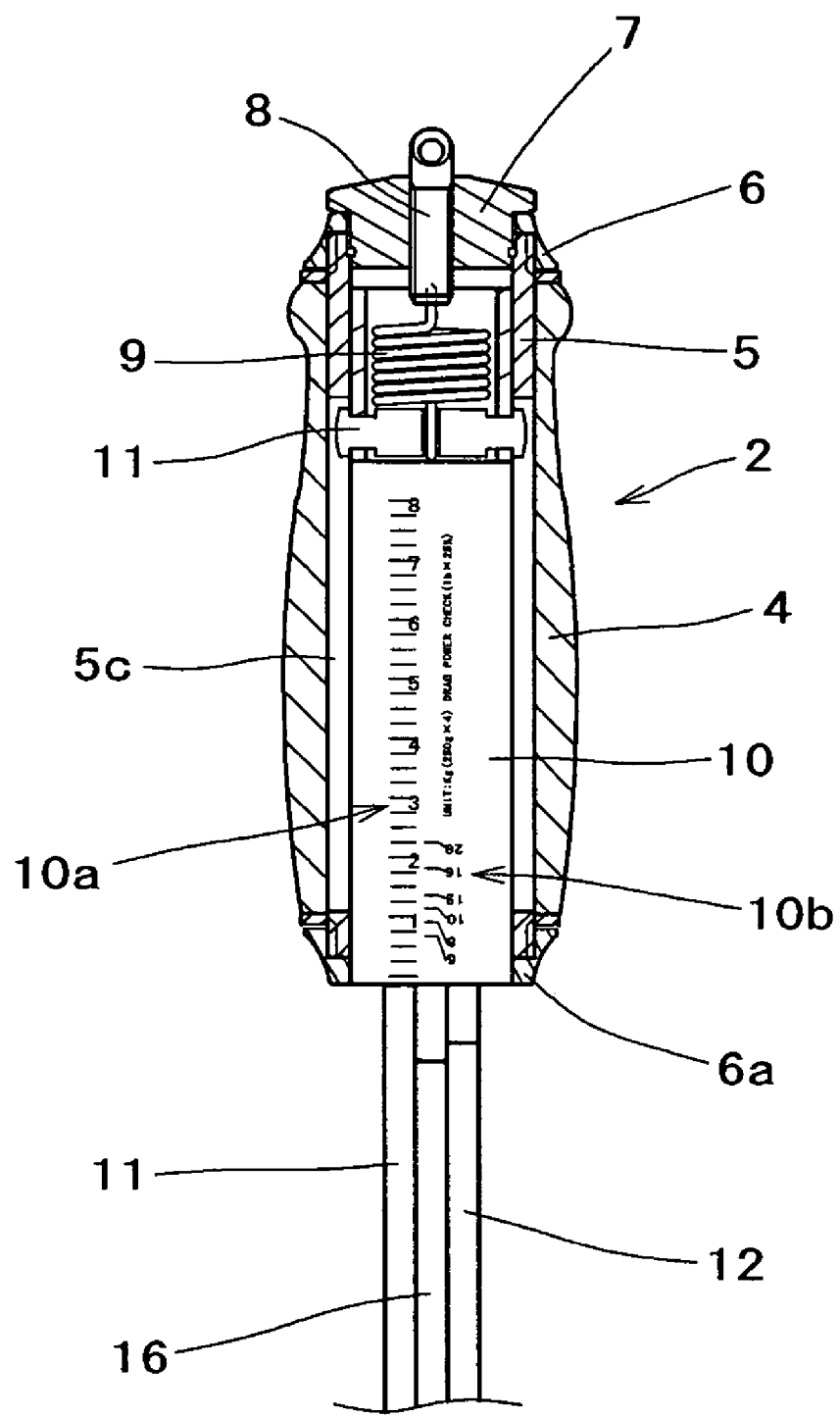
FIG. 7 is a side view of the balance part in a non-weighing state, including a longitudinal section of the grip and the guide tube of the fish handling tool.
Figure 8:
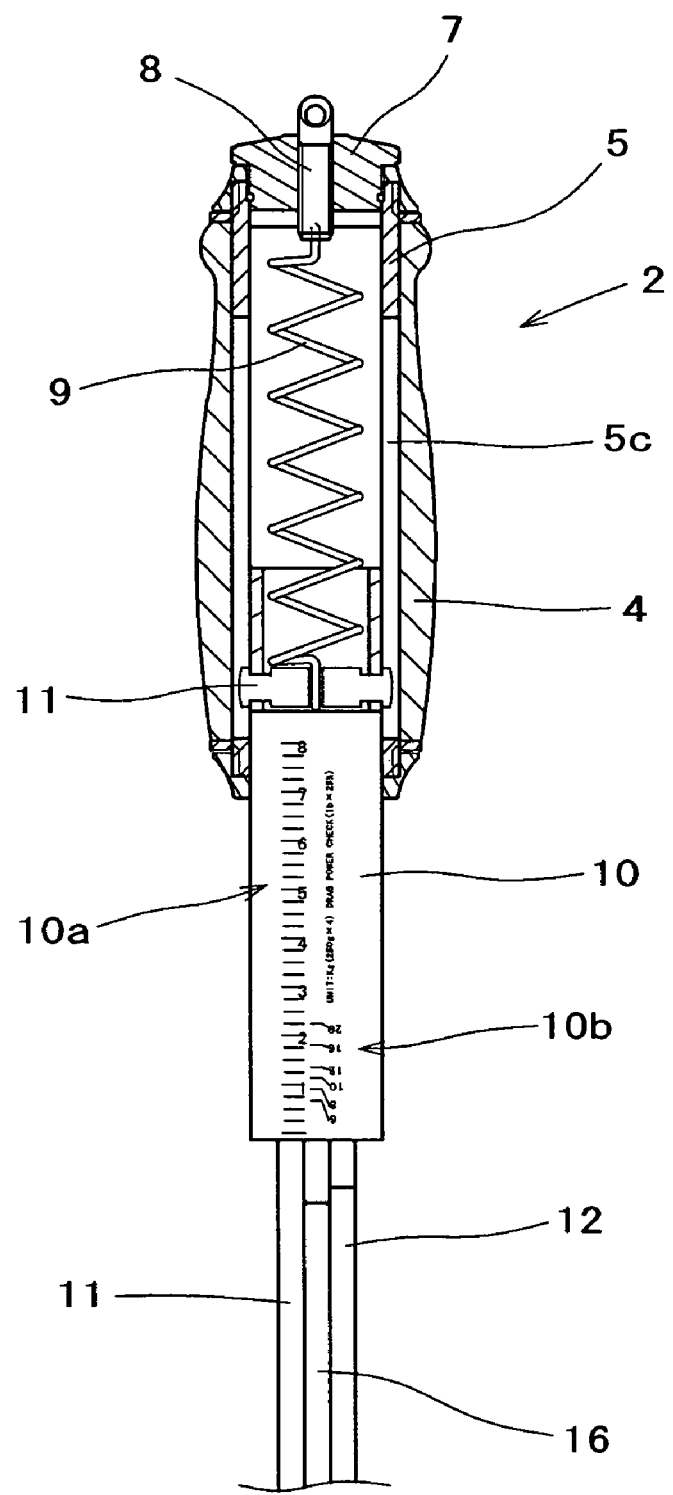
FIG. 8 is a side view of the balance part in a weighing state, including a longitudinal section of the grip and the guide tube of the fish handling tool.

Next, an embodiment of the invention is explained with reference to the drawings. In the figures, the reference numeral 1 denotes a fish handling tool, and the fish handling tool 1 includes a balance part 2 and a nipping part 3. The balance part 2 is a spring balance, and is formed by using a rod-like grip 4 (FIG. 5) shaped into a spindled cylinder. Inside a cylinder 4a of the grip 4, a cylindrical guide tube 5 is installed so as to penetrate vertically, screw grooves are cut in the outer circumferences of projections 5a, 5b projecting vertically from the grip 4, and upper and lower holders 6, 6a are screwed to the projections 5a, 5b, whereby the guide tube 5 can be attached to the grip 4. A cap 7 is supported rotatably on the guide tube 5 around the longitudinal axis while preventing coming-off. A screw hole 7a is cut in the longitudinal axis direction at the center of the cap 7. In this screw hole 7a, a hanger 8 is screwed while penetrating the cap 7 vertically, and at a portion of the hanger 8, projecting upward from the cap 7, is a through hole 8a for attaching a portable tool, such as a strap (not shown). One end (upper end) of a balance coil spring 9 is latched on a portion 8b projecting downward from the cap 7. The reference numeral 4b denotes a washer interposed between the grip 4 and the upper and lower holders 6, 6a.

The reference numeral 10 denotes a movable member shaped into a bottomed cylinder whose upper side is opened. The coil spring 9 is loosely fit on the upper end of the movable member 10, and the other end (lower end) of the coil spring 9 is latched on a guide pin 11 attached so as to penetrate laterally the movable member 10. On the other hand, a lateral projection 11a of the guide pin 11 projecting from the movable member 10 is slidably fitted in a slot-shaped guide hole 5c formed in a lateral circumferential portion of the guide tube 5. When a load acts to pull the lower side of the movable member 10 downward, the coil spring 9 extends corresponding to the strength of the load. Based on this, the movable member 10 projects downward from the lower end of the guide tube 5, whereby the balance part 2 acts as a spring balance. Weighing graduations 10a indicating a weight are provided on the outer circumference of the movable member 10. In this embodiment the weighing graduations 10a are set so that their units are kilograms (kg) (pounds are also possible). By rotating the cap 7 while holding the hanger 8, the hanger 8 moves up and down with respect to the cap 7, whereby the movable member 10 moves up and down with respect to the guide tube 5 to perform zero-point adjustment of the balance part 2. The zero-point adjustment can be made by adjusting the line of 0 kilograms of the weighing graduations 10a so as to match the lower end of the lower holder 6a.

Furthermore, drag graduations 10b for indicating drag of a reel (not shown) to be used for fishing are provided on the outer circumference of the movable member 10 in parallel to the weighing graduations 10a. A nylon string (fishing line) strength in lure fishing is expressed in units of pounds (lb) in many cases, and based on the drag graduations 10b, the reel is set to a drag force multiplied by the nylon string strength by a predetermined ratio (25% selected in this embodiment although, for example, 20%, 25%, or 33% can be selected depending on fisherman's preference and skill). Namely, when a nylon string with a strength of 6 pounds is wound around the reel, the reel is set to a drag force of 0.4536 (=1 pound)×6×0.25≈0.680 kg, and a mark "6" indicating 6 pounds is put on a point of the weighing graduations 10a corresponding to 0.680 kg, and the value is marked by pulling this out, whereby a fisherman can easily adjust the drag force of the reel according to the nylon string strength. The setting of the drag force is selected depending on the fisherman's skill or preference as described above, so that it is also possible that a plurality of sets of drag graduations 10b are provided on the movable member 10 corresponding to the multiplying ratios, and a fisherman selects the graduations. When a plurality of sets of the drag graduations are provided, for example, they are provided by being divided between both sides of the weighing graduations 10a, or provided on the outer circumferential surface of the movable member 10 on the side with no weighing graduations 10a.

On the other hand, the nipping part 3 is integrally attached to the lower end of the movable member 10 forming the balance part 2, and at the lower end of the movable member 10, both circumferential surfaces are cut into concave grooves while leaving a predetermined thickness to avoid the portions provided with the graduations 10a, 10b, whereby forming an attaching part 10d, and upper ends 11a, 12a of first and second main bodies 11, 12 forming the nipping part 3 are fixed to the attaching part 10d by a screw 10e while sandwiching the attaching part 10d from both sides. Thereby, the first and second main bodies 11, 12 are assembled to face each other while separating at a distance corresponding to the thickness of the attaching part 10d from each other. Between the first and second main bodies 11, 12 facing each other, a fixed tooth 13 and a movable tooth 14 for nipping the jaw (lower jaw) of a fish, a working member 15 for swinging the movable tooth 14, and an operating member 16 for operating the working member 15 are interposed. The first and second main bodies 11, 12 are attached to be horizontally displaced from each other at their tip ends with respect to any plane P passing through the center line O of the grip 4.

Figure 1:
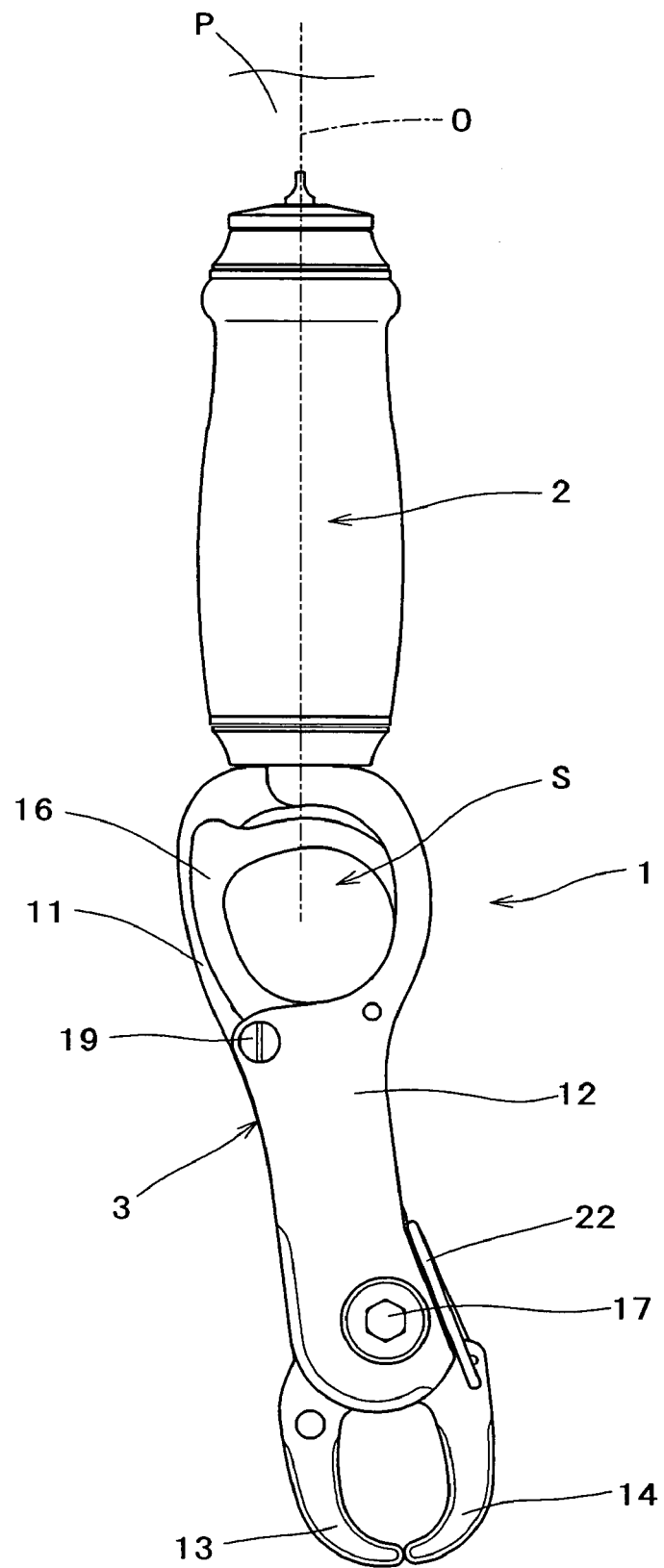
FIG. 1 is a front view of the fish handling tool.
Figure 2:
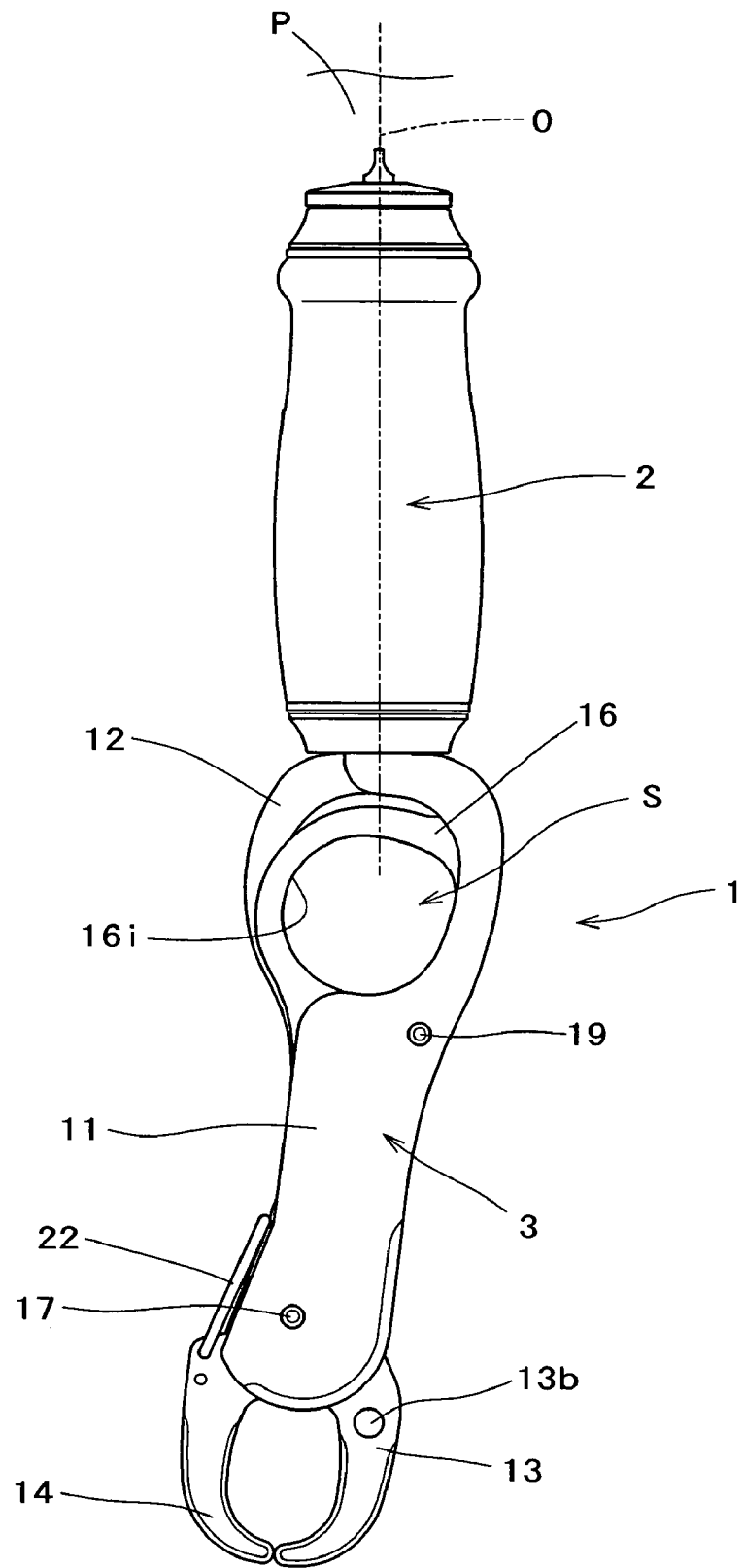
FIG. 2 is a back view of the fish handling tool.
Figure 3:
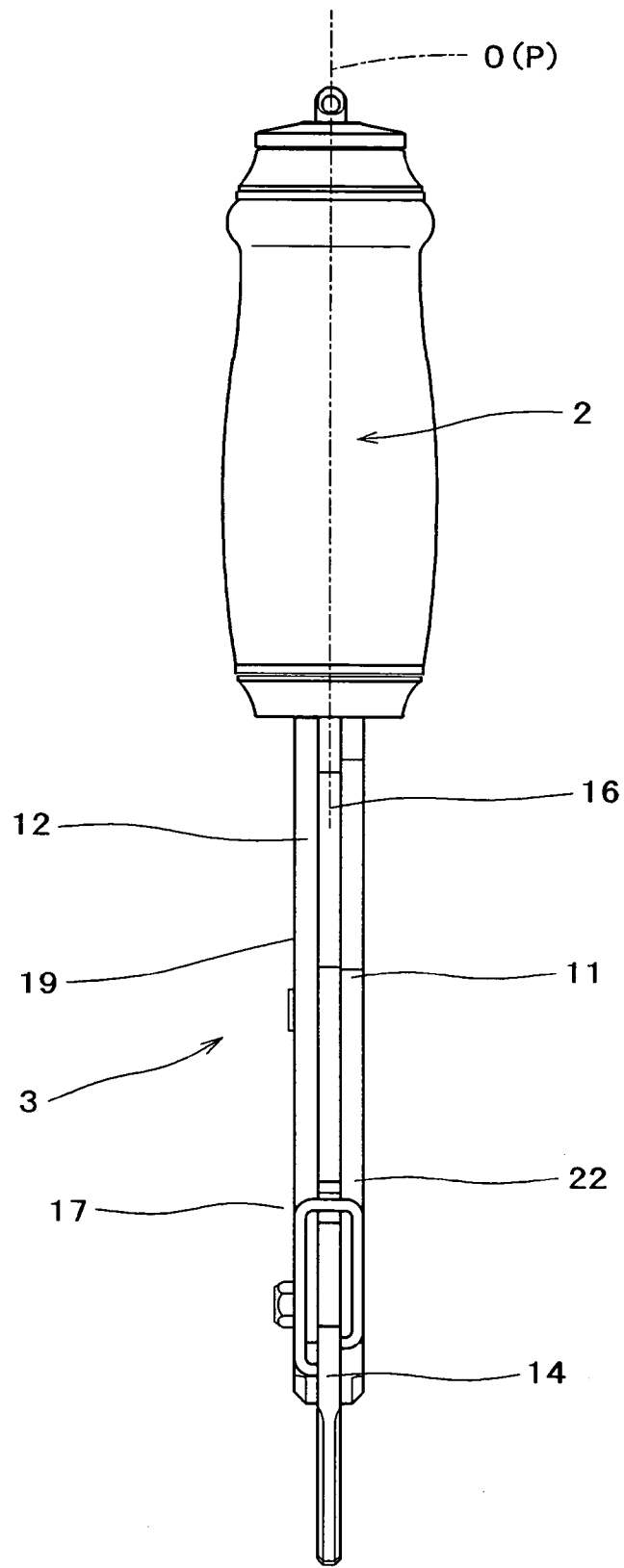
FIG. 3 is a side view of the fish handling tool.
Figure 4:
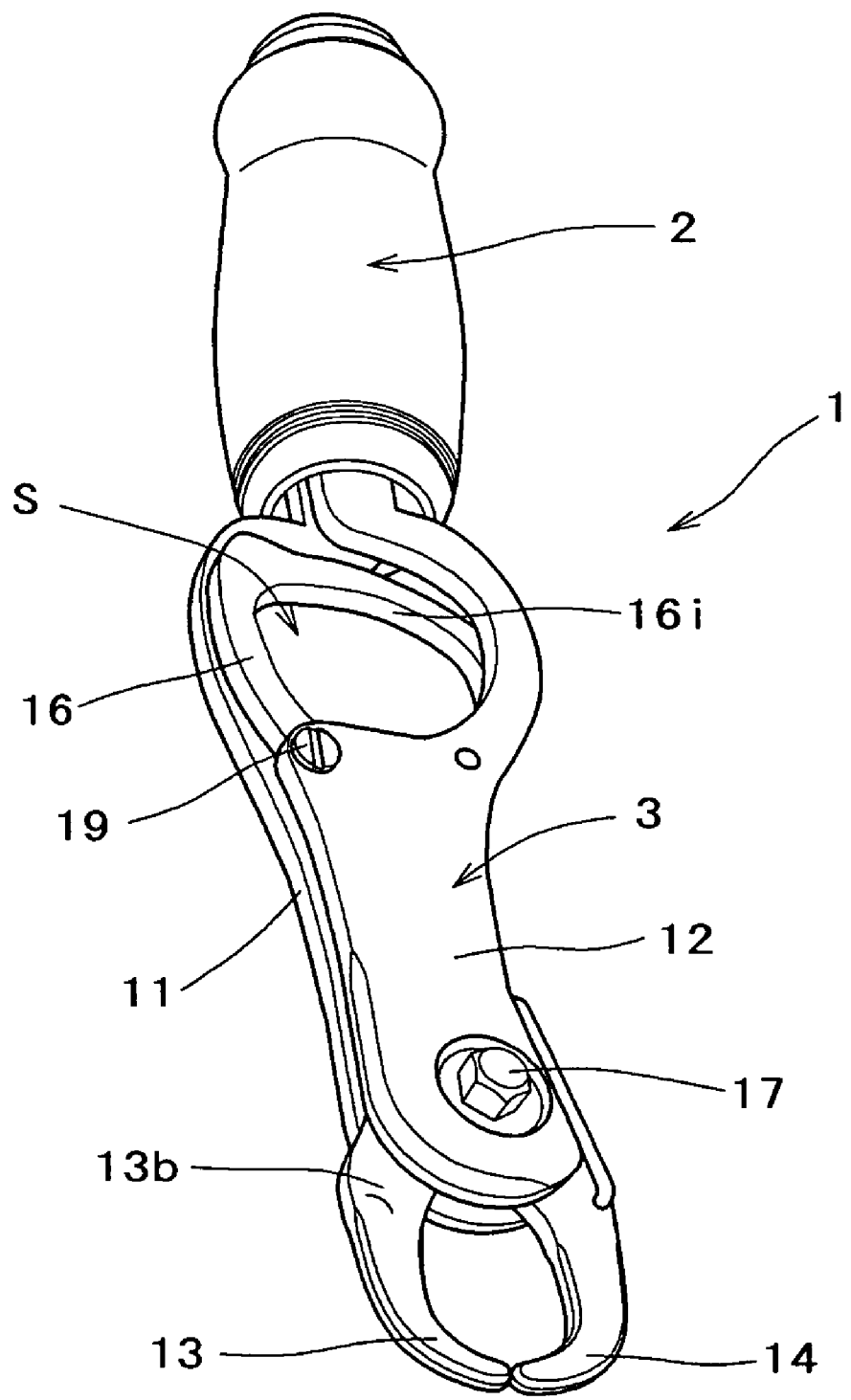
FIG. 4 is a perspective view of the fish handling tool.

On the first and second main bodies 11, 12, swelling portions 11b, 12b swelling in laterally opposite directions while continuing from the upper ends 11a, 12a are formed, and an inserting space S (FIG. 1) in which a finger can be inserted is formed by the swelling portions 11b, 12b. The first and second main bodies 11, 12 overlap (stack) their lower halves with each other, and to the lower end of the first main body 11. The fixed tooth 13 formed into a sickle shape, projecting downward from the lower end of the first main body 11, is fixed by a screw 13a.

On the other hand, the movable tooth 14 has a sickle shape in reverse to the fixed tooth 13. A bolt 17 for fixing the lower portions of the main bodies 11, 12 to each other is axially supported in a swing hole 14a in a rotatable manner (in the main bodies 11, 12, a screw hole 11c and a clearance hole 12d for inserting a bolt 17 are opened as through holes). A pin 14c fitted and fixed in a working hole 14b opened at a position higher than the swing hole 14a is fitted in the working hole 15a opened at the lower end of the working member 15 so as to swing. The working member 15 swings as described later by fitting in a concave groove 11h cut in the first main body 11 while the side surface of the working member 15 slightly projects. In the working member 15, a lower slot 15b that is positioned higher than the working hole 15a and inclined so as to come closer (biased) toward the fixed tooth 13 side in a downward direction and an upper hole (becomes slightly elongated in the vertical direction) 15c positioned at the upper end are opened.

In the operating member 16, a concave groove 16a is formed into which the portion of the working member 15, projecting from the concave groove 11b, fits. A projection 16b is formed to fit a long groove 12c formed vertically in the second main body 12 in a vertically slidable manner, and a pin 16d is fixed in a support hole 16c opened at the center of the projection 16b and is further internally fitted and engaged in the lower slot 15b in a movable manner.

In the operating member 16, a pair of slots 16e, 16f, vertically elongated, are formed on the left and right sides. Upper and lower pins 18, 18a (to fit in pin holes 11e, 11f, 12f, 12g opened in the first and second main bodies 11, 12) interposed between the first and second main bodies 11, 12 penetrate the slots 16e, 16f. The upper pin 18a of the pins further penetrates the upper slot 15c of the working member 15. At the middle portions of the first and second main bodies 11, 12, the holes (screw hole) 11d and (clearance hole) 12e in which the screw 19 for fixing the main bodies 11, 12 are opened. The screw 19 comes into contact with the groove bottom of a concave groove 16g formed in the side edge of the operating member 16 and the projection 16b is engaged in the long groove 12c. With this structure, the operating member 16, while being sandwiched between the first and second main bodies 11, 12, moves vertically but is controlled to move within a limited moving range.

Furthermore, in the operating member 16, a slot 16h for installing a return spring 20 is formed. The return spring 20 is supported at its one end (lower end) on the hole end, and the other end is supported by a pin 21 interposed between pin holes 11g, 12h formed in the first and second main bodies 11, 12, elastically pressed by an upward movement of the operating member 16 according to an upward operation of the operating member 16 by inserting a finger in a finger hook 16i formed in a ring shape at the upper side of the operating member 16. When the operation is released, the operating member 16 is returned to the lower side original position. The reference numeral 22 denotes a return spring provided on the movable tooth 14.

In the finger hook 16i, the finger hooking position is disposed on the upper part on which a user hook his or her fingers when moving up the operating member 16. The finger hooking position is set to cross the center line O of the grip 4 in any position, whether the operating member 16 takes the non-operating position or during movement toward the upper side.

Figure 9:
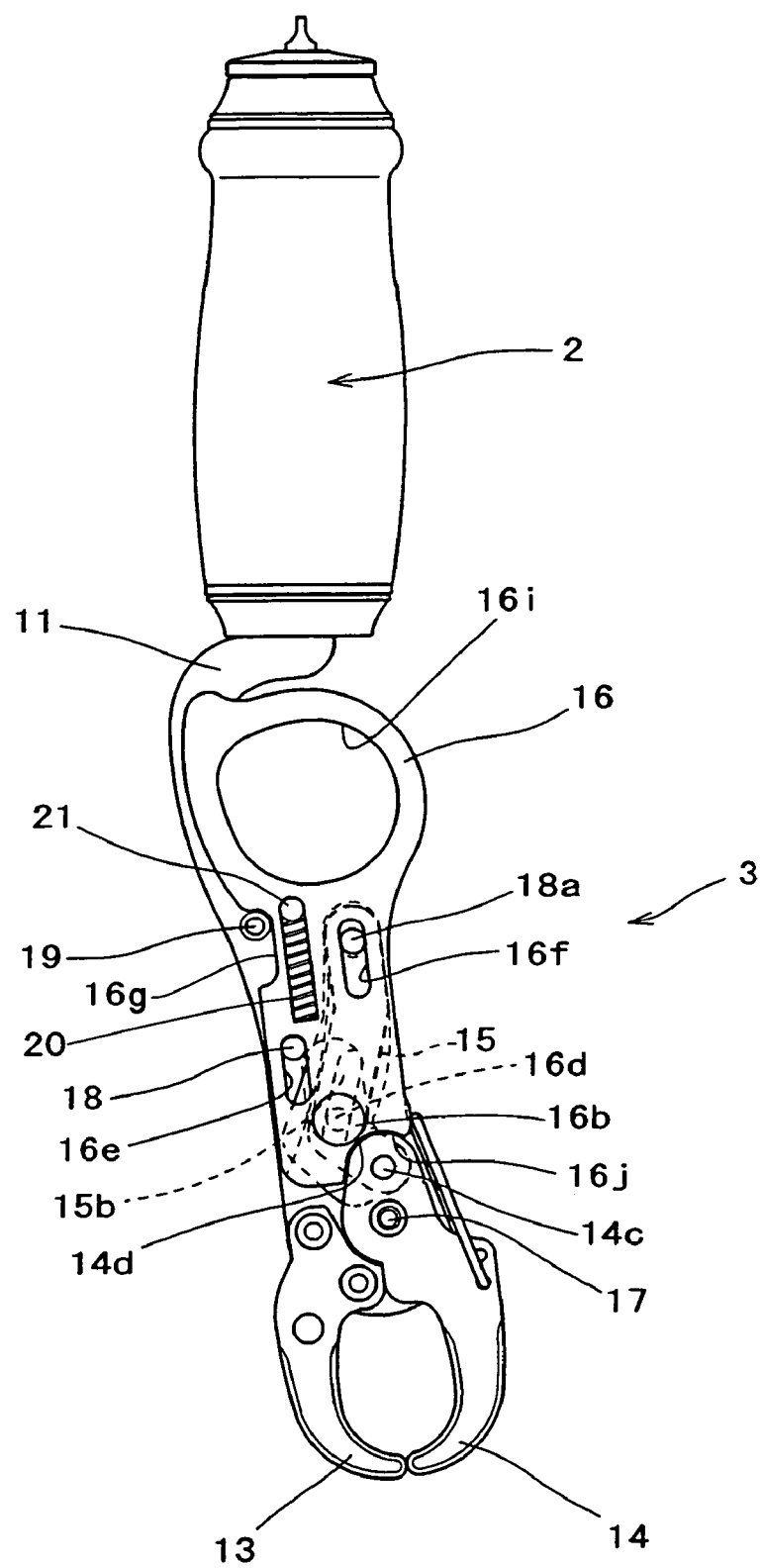
FIG. 9 is a front view of the nipping part in a closed state, omitting the second main body of the fish handling tool.

In the nipping part 3, in an unoperated state of the operating member 16, the operating member 16 is positioned at an unoperated position on the lower side by receiving pressing forces of the return springs 20, 22. The front end of the movable tooth 14 is closed by butting against and coming into contact with the front end of the fixed tooth 13. At this unoperated position, as shown in FIG. 9, in the operating member 16, the pin 18 is positioned at the upper end of the slot 16e, the pin 18a is positioned proximate the upper end of the slot 16f, the screw 19 is positioned at the upper end of the concave groove 16g, and the projection 16b is positioned at the lower end of the slot 12c. In this posture, the pin 16d is positioned at the inclination lower end of the working member lower slot 15b, so that the working member 15 is positioned on the movable tooth 14 side as shown in FIG. 9. Therefore, the movable tooth 14 is in a nipping posture (closed posture) by swinging the front end side toward the fixed tooth 13 side. In this state, when the fixed tooth 14 is forcibly opened, a load in the direction of moving toward the fixed tooth 13 side is applied to the pin 16d, and this load swings the working member 15 laterally toward the fixed tooth 13 side by using the upper pin 18a as a fulcrum. This load makes the projection 16b cross the slot 12c and makes the pin 16d cross the lower slot 15b. Furthermore, the upper edge 14d of the movable tooth 14 enters an arc groove-shaped locking surface 16j formed at the lower end of the operating member 16 and restricts the rotation of the movable tooth 14 (corresponding to "a lock means") to separate from the fixed tooth 13, thereby preventing a handled fish from coming off due to an unexpected opening of the movable tooth 13.

Figure 10:
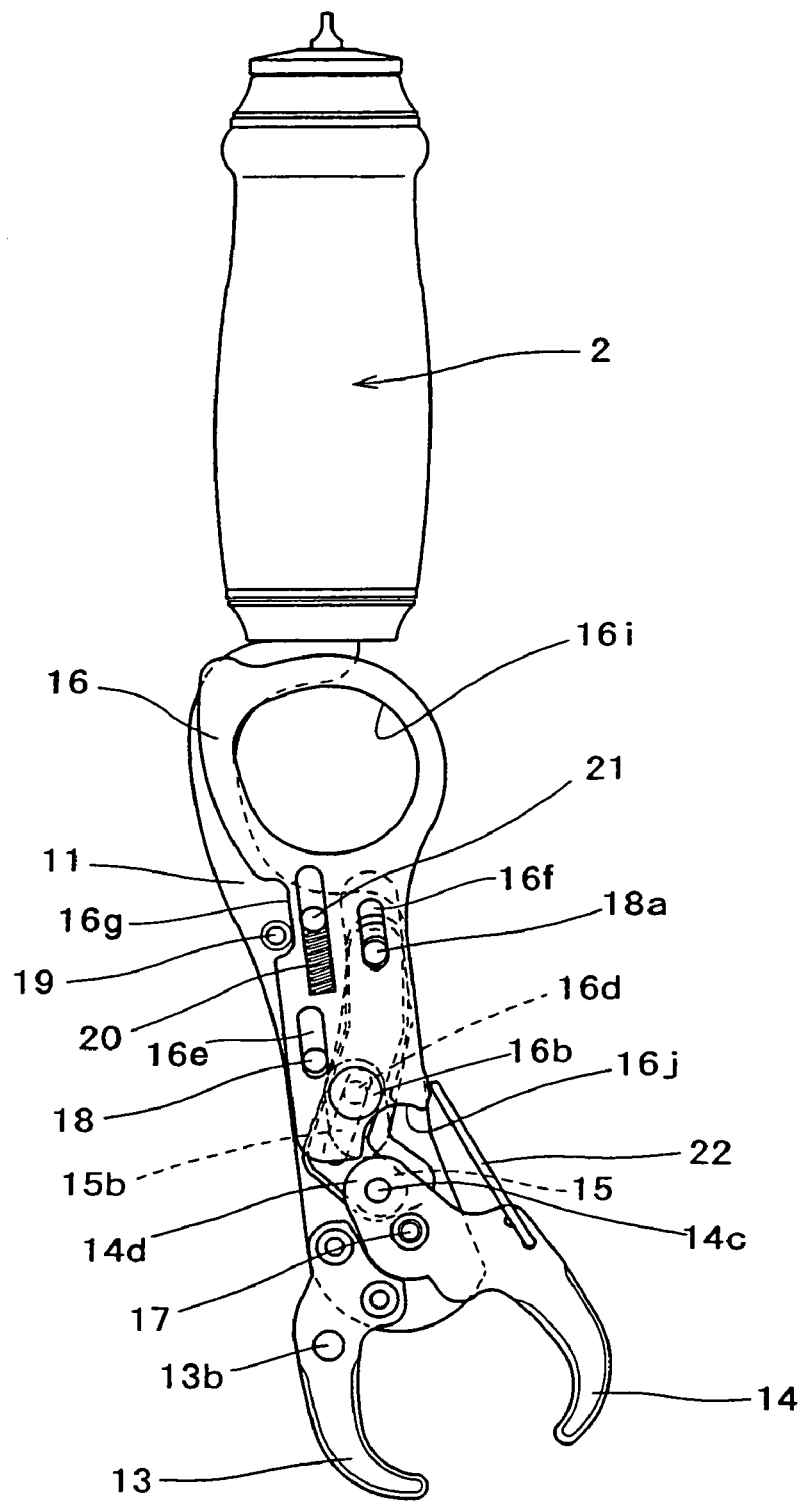
FIG. 10 is a front view of the nipping part in an opening state, omitting the second main body of the fish handling tool.
Figure 11:
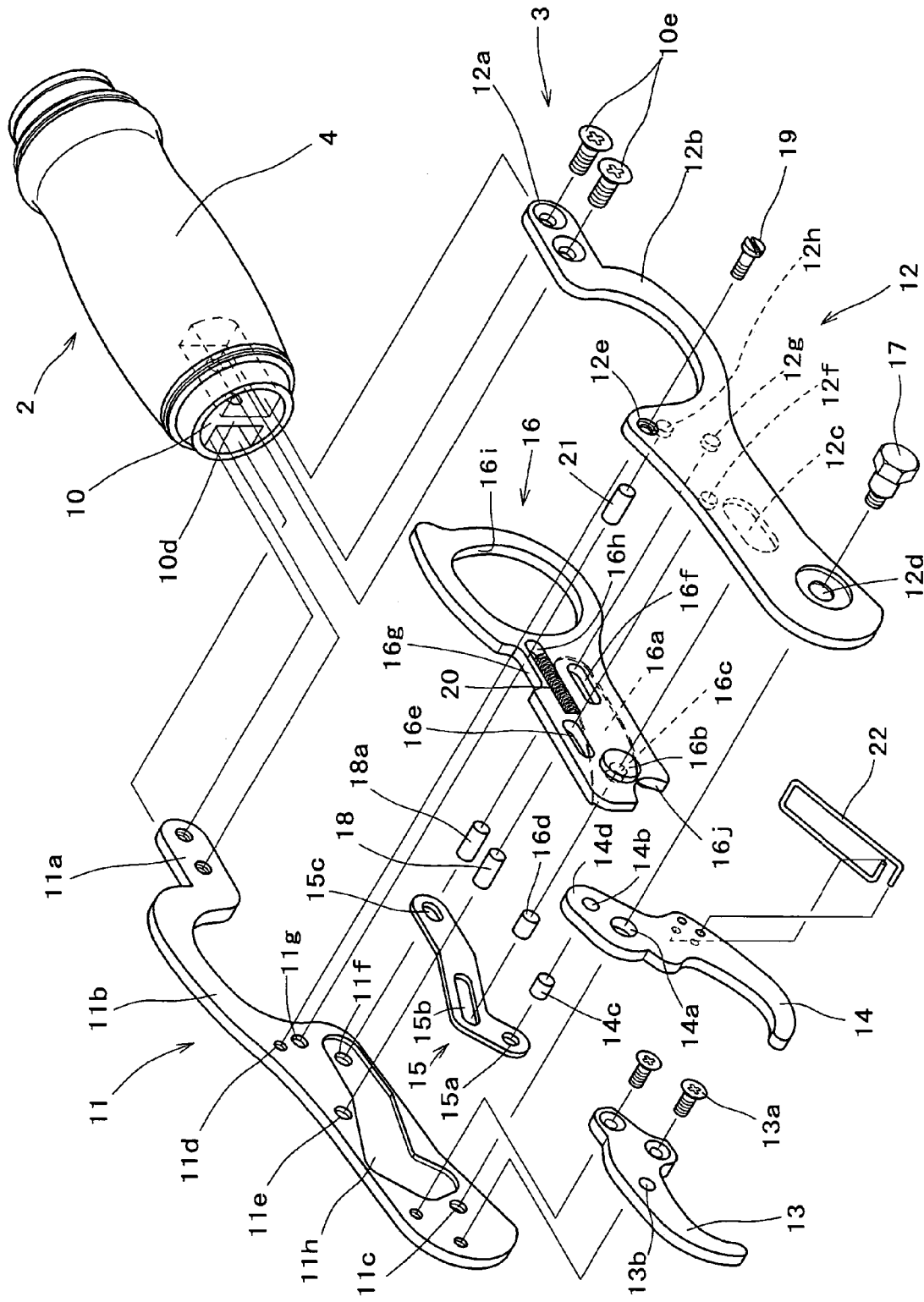
FIG. 11 is an exploded perspective view of the nipping part of the fish handling tool.
Figure 12:
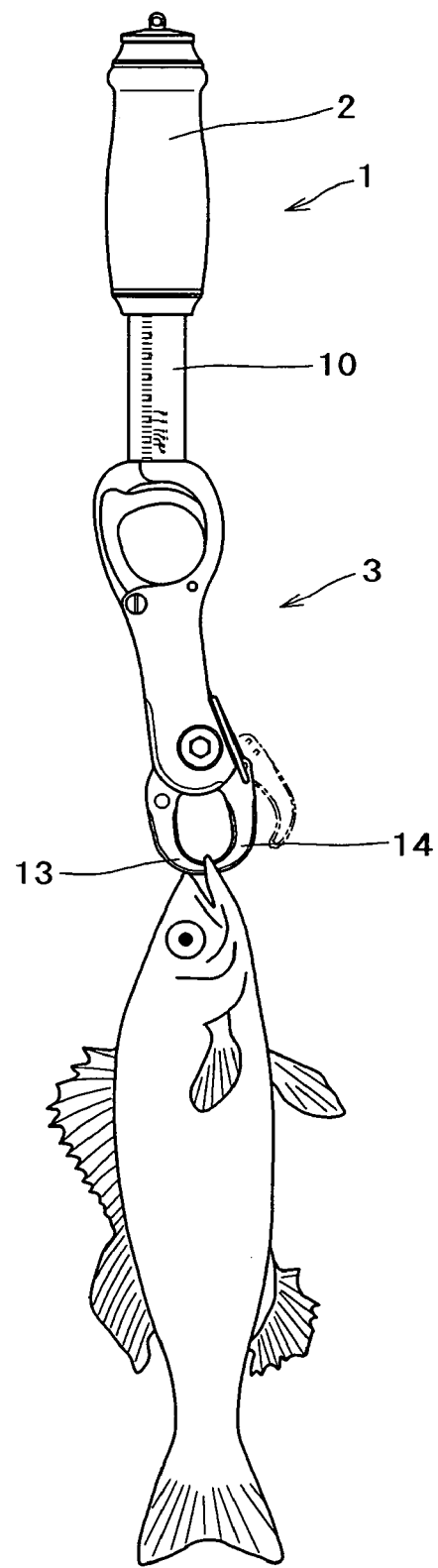
FIG. 12 is a working explanatory view of a fish weighing state.
Figure 13:
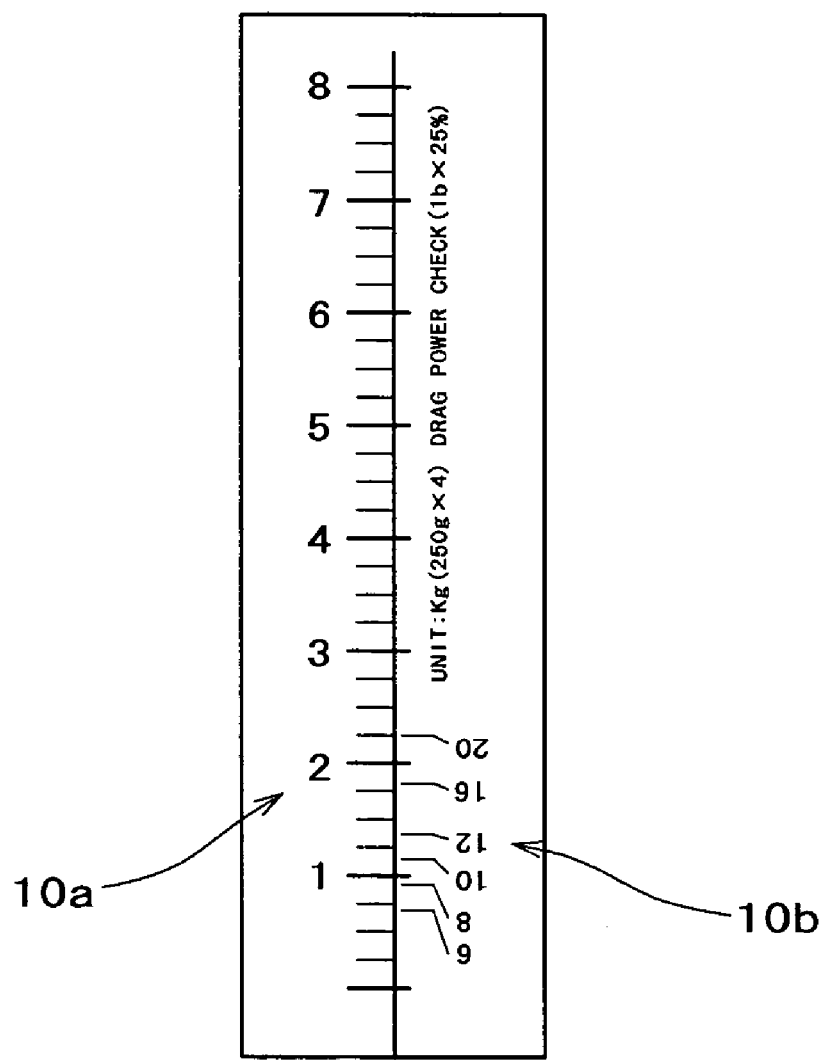
FIG. 13 is an enlarged view of graduations.
Figure 15:
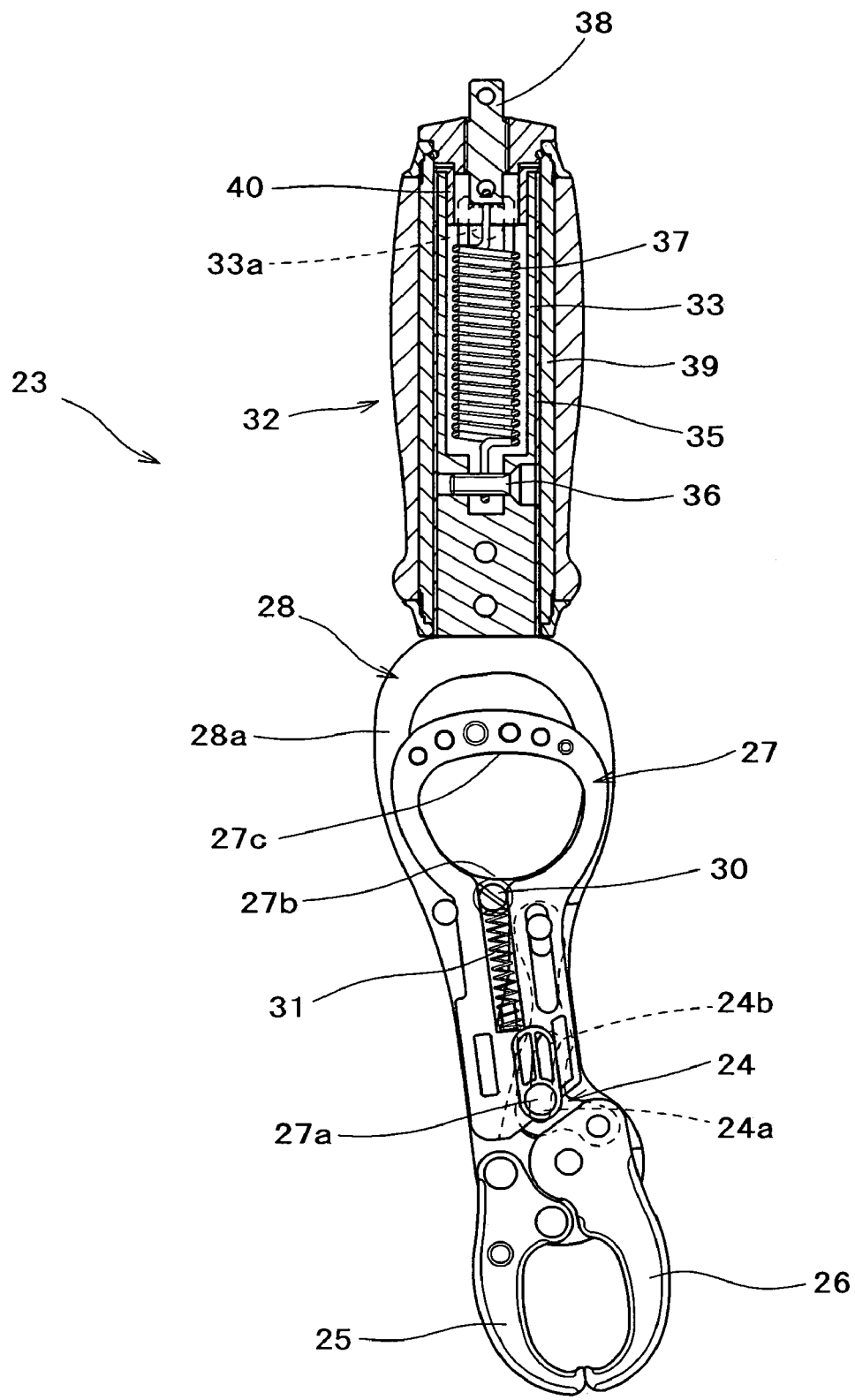
FIG. 15 is a front view of a fish handling tool in the second exemplary embodiment showing a balance part at cross section and a nipping part with a second main body omitted.
Figure 16:
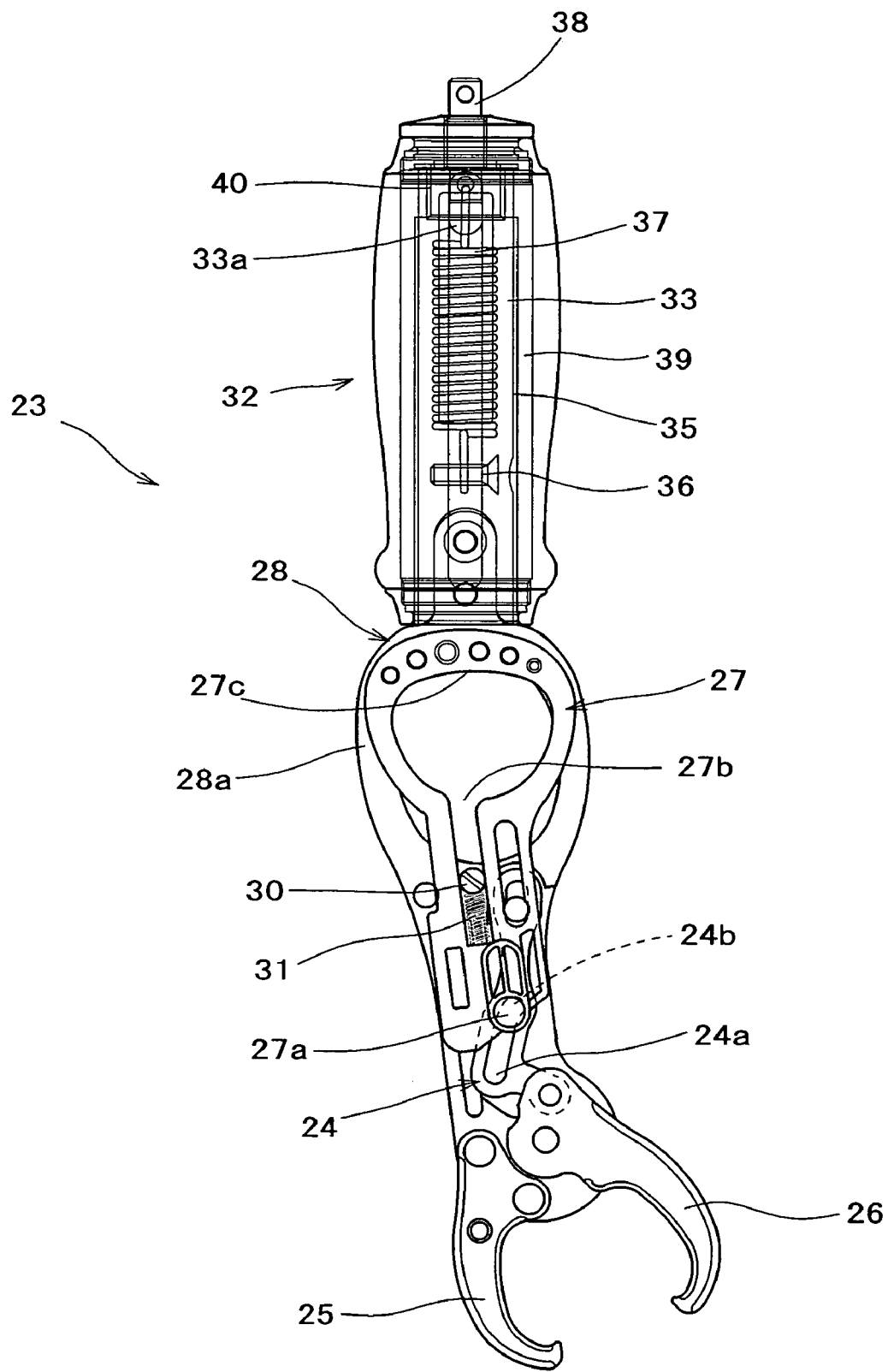
FIG. 16 is a front view of a fish handling tool in the second exemplary embodiment showing transparent view of the balance part and opening state of the movable tooth.
Figure 17:
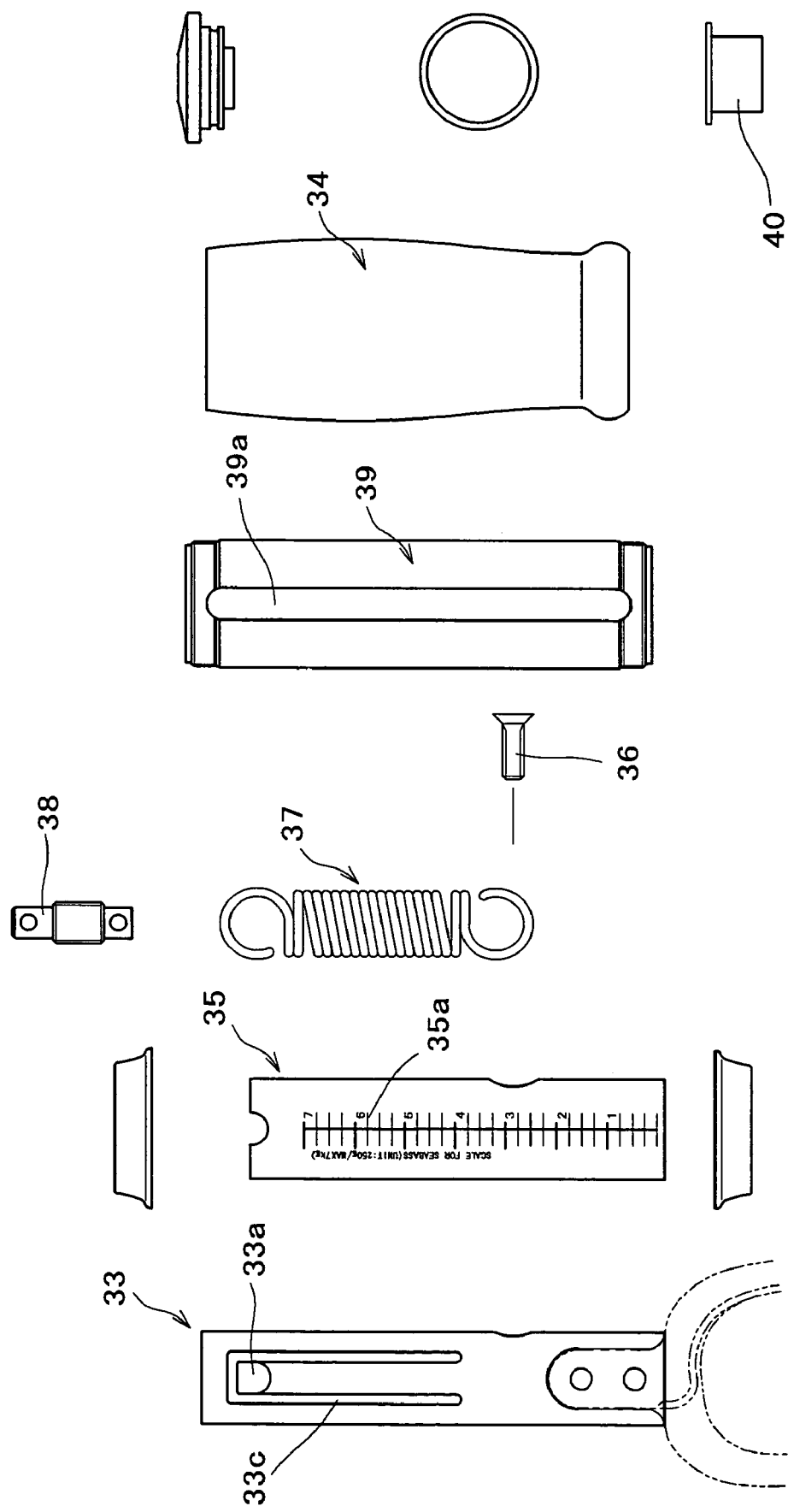
FIG. 17 is a part drawing of the balance part in the second exemplary embodiment.
Figure 18:
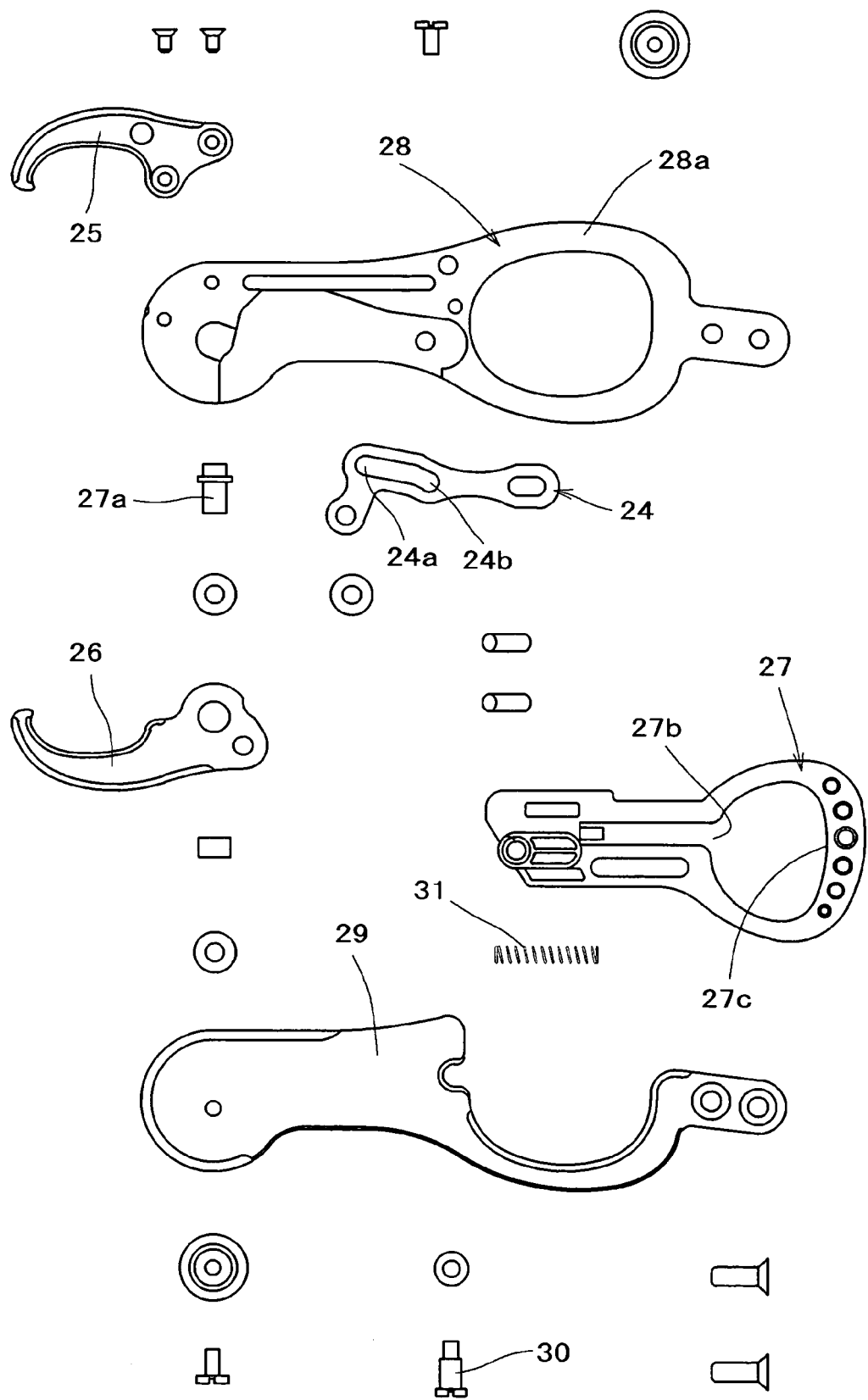
FIG. 18 is a part drawing of the nipping part in the second exemplary embodiment.

On the other hand, when the operating member 16 is lifted, as shown in FIG. 10, the operating member 16 moves up against the pressing force of the return spring 20 while the pins 18, 18a, the screw 19, and the projection 16c are guided as described above, and the pins 18, 18a relatively move to the lower end positions of the slots 16e, 16f, the screw 19 relatively moves to the lower end position of the concave groove 16g, and the projection 16b relatively moves to the upper end position of the slot 12c. At this time, the pin 16d provided on the projection 16b moves to the upper end position along the inclined surface of the working member lower slot 15b. According to this movement, the working member 15 swings laterally toward the fixed tooth 14 side by using the upper pin 18a as a fulcrum to have a lock released, whereby the movable tooth 14 is forcibly moved (corresponding to a "forced movement means") and swings to separate from the fixed tooth 13 against the pressing force of the return spring 22 by using the bolt 17 as a fulcrum, thereby assuming a posture for nipping. In the fixed tooth 13, a latching hole 13b for latching a hook is opened.

As described above, in the embodiment of the invention, when a fish is caught, the operating member 16 is lifted while the grip 2 of the fish handling tool 1 is held to open the movable tooth 14 from the fixed tooth 13. The fixed tooth 13 is inserted into the lower jaw (generally, the lower jaw of a fish is strong, and is hardly damaged) of a hooked mouth of the fish so as to nip the jaw, and then the operating member 16 is released, whereby the movable tooth 14 swings outside of the lower jaw and abuts the lower jaw and the teeth 13, 14 nip the lower jaw. By removing the hook in this state, the hook can be removed without touching the fish body, so that the fish is not damaged.

In this way, when nipping a fish, the fixed 13 tooth does not move inside the jaw and the movable tooth 14 outside the jaw moves taking a nipping position. Therefore unlike the conventional tool where even the tooth inserted into the jaw is apt to move and a fish comes off from the tooth due to an unstable nipping operation, the embodiment realizes a stable nipping operation.

Then, when the grip 2 is held and lifted, the movable member 10 provided in the grip 2 comes out of the grip 4 against the pressing force of the coil spring 9, whereby the fish can be weighed.

As described above, the fish handling tool 1 of this embodiment has a fish handling mechanism and a measurement mechanism. When the drag force of the reel is adjusted, a rod attached with the reel is fixed at its end while the rod tip turns diagonally upward, and the fish handling tool 1 is pulled while the hook joined to the nylon string wound around the reel is latched in the latching hole 13b, whereby the rod warps and the nylon string is tensioned, and the movable member 10 comes out by receiving this tension. When the nylon string has a strength of 6 pounds as described above and it is desired to set the drag force to 25% of the nylon string strength, if the nylon string is fed out by the pulling operation before the drag graduations 10b indicates the value "6," the drag force is increased, and when the nylon string does not come out even when the drag exceeds the value "6," the drag force is reduced. By adjusting to a state in that the fishing line is about to come out at a drag force of the value "6," drag adjustment is made.

In the embodiment, the drag adjustment of the reel can be made by using a weighing mechanism provided in the fish handling tool 1, and the drag graduations 10b in this case are marked to indicate fishing line strength values at graduation positions corresponding to values multiplied by the strength of the fishing line by desired ratios. As a result, in drag adjustments, calculation by multiplying the weighing graduations 10a by desired ratios becomes unnecessary, whereby drag adjustments can be quickly and reliably made.

Furthermore, the nipping part 3 is inclined with respect to the balance part 2 forming the fishing handling tool 1 while biased to the movable tooth 14 side, so that weighing and hook removal by holding the grip 4 by hand are easier than in the case of the straight nipping part, and the holding direction is easily known even during prompt operation or operation in the dark.

In addition, for latching a fish, the movable tooth 14 opens by lifting the tool by inserting a finger in the ring-shaped finger hook 16i while holding the grip 4. In this state, one tooth is inserted in the mouth of the fish and the finger hook 16i is released, whereby the fish can be handled by automatically nipping the mouth (lower jaw) of the fish. As a result, a fish handling operation and weighing operation can be performed by the hand holding the grip 4, and this improves the operability.

Furthermore, because the operating member 16 is disposed between the first and second main bodies opposing each other and the finger hooking position on the operating member 16 crosses the center line O of the rod-like grip, the finger hooking position is prevented from deviating from the center line O thereby enabling the operation of pulling up the operating member 16 along the center line O. Doing so realizes not only easy finger hooking but also ensures the operation of nipping a fish using a fish handling tool 1 without a failure of nipping.

It is needless to say that the disclosure is not limited to the exemplary embodiment discussed above but it is also practiced by a second exemplary embodiment of a fish handling tool 23 shown in FIGS. 14 through 18. In the fish handling tool 23 of the second embodiment, a working member 24, a fixed tooth 25, a movable tooth 26 and an operating member 27, which compose a nipping part respectively, correspond to the working member 15, the fixed tooth 13, the movable tooth 14 and the operating member 16 in the first exemplary embodiment. The second exemplary embodiment will be described below with respect to the main difference from the first exemplary embodiment. With respect to the same structures, the same as or only slightly different from elements of the first exemplary embodiment, which are understood without explanations, the descriptions will be omitted.

The working member 24 is provided with a slot having a lower half of the slot 24a (FIG. 18) and an upper half of the slot 24b. Like the slot 15b in the first exemplary embodiment the lower half of the slot 24a is formed to incline downwardly so as to come closer (biased) to the side of the fixed tooth 25. The upper half of the slot 24b is formed so as to incline more steeply than the lower half of the slot 24a with respect to the center line O, thereby realizing the structure that the moving distance of the working member 24 in the horizontal direction is longer in the case that a bolt 27a has passed through the upper half of the slot 24b comparing with the case that the bolt 27a has passed through the lower half of the slot 24a. Therefore when changing the movable tooth 26 from the closed posture to the posture where a fish can be nipped the movable tooth 26 can be gradually separated from the fixed tooth 25 and then suddenly separated from it immediately before taking the posture where a fish can be nipped. These structures prevent the movable tooth 26 from moving and separating from the fixed tooth 25 so that a fish comes off from the tool when a user inadvertently touches an operating member during nipping the fish.

Additionally a first main body 28 is provided with a swelling section 28a. Unlike the corresponding swelling portion 11b of the first main body 11 in the first exemplary embodiment the swelling section 28 is formed to be in a ring-shape by swelling the part which corresponds to the portion opposing the swelling portion 11b and is also formed along the ring-shaped finger hook 27c of the operating member 27. As a result the stable operation of moving the operating member 27 upward and downward can be done.

Furthermore in the second exemplary embodiment it is arranged that only one component (part) is used instead of the pin 18, 21 and the screw 19 in the first exemplary embodiment. More specifically, it is arranged that a screw 30, for fixing the first main body 28 to a second main body 29, is disposed so as to penetrate through an upper opening edge 27b formed in the operating member 27. In this state, the screw 30 is brought into contact with the upper end of a return spring 31. When having moved up the operating member 27 and separated the movable tooth 26 from the fixed tooth 25, the return spring 31 which contacts the lower edge of the screw 30 is compressed. In this separating state when releasing fingers from the operating member 27, the operating member 27 moves to return in accordance with the restoring force of the return spring 31 and the movable tooth 26 moves to take the original posture. In the second exemplary embodiment the restoring movement of the movable tooth 26 can be also done by using the urging force of the return spring 31. As a result the return spring 22 for the movable tooth used in the first exemplary embodiment is omitted in this embodiment.

A movable member 33 (FIGS. 15-17) of a balance part 32 is provided with projections 33a on the upper edge of the outer circumference, which protrude outward and prevent the movable member 33 from separating from a grip 34. Weighing and drag graduations 35a, 35b are provided on a graduation tube 35 which is fitted over the movable member 33. The projections 33a are movable in the radial direction by slits 33c which are formed in the movable member 33, thereby allowing insertion of the graduation tube 35 over the movable member 33 by depressing the projections 33a into the movable member 33. Furthermore a screw 36 which has been threaded from the circumferential surface of the graduation tube 35 is inserted into the movable member 33. A coil spring 37 for weighing is supported by the screw 36 at the lower end and is connected to the lower end of a rod-like hanger 38 at the upper end. The projections 33a are fitted into guide slots 39a which are formed in a guide tub 39 to be vertically movable. A restricting member 40, for restricting the projections 33a from oscillating toward the inside of the tube, is mounted on the opening upper end of the movable member 33.

In the exemplary second embodiment, like the first embodiment, the finger hooking position of the finger hook 27c is arranged to cross the center line O of the grip 34.

What is claimed is:

1. A fish handling tool, comprising:
   a rod-like grip;
   a main body supported by the grip at a base end thereof;
   a fixed tooth fixed to a tip end of the main body at a base end thereof;
   a movable tooth pivotally supported by the tip end of the main body at a base end thereof and allowing a tip end of the movable tooth to abut against a tip end of the fixed tooth in an original position;
   a lock means for preventing the movable tooth from moving so as to not separate the tip end of the movable tooth from the tip end of the fixed tooth;
   an operating member having a finger hook movably provided on the main body;
   a forced movement means provided between the operating member and the lock means and forcibly separating the tip end of the movable tooth from the tip end of the fixed tooth by releasing the lock means by forcibly moving the finger hook provided on the operating member toward the grip; and
   a return spring returning the forced movement means along with the lock means, the operating member and the movable tooth into their respective original positions by releasing a forced movement of the finger hook, wherein
   a finger hooking position on the finger hook crosses a center line of the rod-like grip,
   the fish handling tool is structured such that when the finger hook is hooked with a finger of a hand that grips the rod-like grip and the finger hook is pushed upward with the finger along the center line of the rod-like grip, the movable tooth is forced to pull away from the fixed tooth in a direction where the tip end of the movable tooth is separated from the tip end of the fixed tooth, and
   the fish handling tool is structured such that when the finger is released from the finger hook and while the finger hook returns to the original position, the forced movement means is released and the movable tooth automatically returns to the original position.

2. The fish handling tool according to claim 1, the fish handling tool flu-ther comprising a balance part that is internally installed in the grip and has a movable member elastically held by a spring, the main body supported by the movable member, wherein weighing graduations for indicating a weight of a fish body and drag graduations for indicating a drag force of a reel are provided on an outer circumferential surface of the movable member.

3. The fish handling tool according to claim 2, wherein the drag graduations indicate values multiplied by a strength of a nylon string to be used by predetermined constants.

4. The fish handling tool according to claim 3, wherein the drag graduations are indicated by values indicating the strength of a nylon string to be used.

5. The fish handling tool according to claim 3, wherein the drag graduations are provided in parallel to the weighing graduations.

6. The fish handling tool according to claim 3, wherein the drag graduations are provided by being pulled out of the weighing graduations.

7. The fish handling tool according to claim 2, wherein the drag graduations are indicated by values indicating the strength of a nylon string to be used.

8. The fish handling tool according to claim 7, wherein the drag graduations are provided in parallel to the weighing graduations.

9. The fish handling tool according to 7, wherein the drag graduations are provided by being pulled out of the weighing graduations.

10. The fish handling tool according to claim 2, wherein the drag graduations are provided in parallel to the weighing graduations.

11. The fish handling tool according to claim 10, wherein the drag graduations are provided by being pulled out of the weighing graduations.

12. The fish handling tool according to claim 2, wherein the drag graduations are provided by being pulled out of the weighing graduations. drag graduations are provided by being pulled out of the weighing graduations.

13. The fish handling tool according to claim 1, wherein a degree of separation between the tip end of the movable tooth and the tip end of the fixed tooth is adjustable based on an amount of movement of the finger hook.

* * * * *